United States Patent [19]

Eyuboglu

[11] Patent Number: 5,446,758
[45] Date of Patent: Aug. 29, 1995

[54] DEVICE AND METHOD FOR PRECODING

[75] Inventor: M. Vedat Eyuboglu, Concord, Mass.

[73] Assignee: Motorola, Inc., Schaumburg, Ill.

[21] Appl. No.: 89,319

[22] Filed: Jul. 8, 1993

[51] Int. Cl.6 .......................... H04B 1/10; H04L 5/12; H04L 27/00; G06F 11/10
[52] U.S. Cl. .................................... 375/259; 375/265; 375/340; 371/43
[58] Field of Search ................ 375/39, 94, 37; 371/43

Primary Examiner—Edward L. Coles, Sr.
Assistant Examiner—John Ning
Attorney, Agent, or Firm—Darleen J. Stockley

[57] ABSTRACT

An improved precoding technique (700) and device (100) allows transmission of a signal point sequence over a channel h(D) to provide efficient data transfer in the presence of intersymbol interference and noise at data rates approaching channel capacity. This improved technique works with trellis-coded modulation and with any signal constellation. Thus, the present invention simplifies shaping and allows signaling at fractional rates without constellation switching. A key advantage of the present invention over prior art is its ability to achieve reduced dither loss by selecting the output components of a mapper based on past components of a channel output sequence.

42 Claims, 3 Drawing Sheets

DEVICE AND METHOD FOR PRECODING

FIELD OF THE INVENTION

This invention relates generally to digital communication systems, and more particularly to precoding a digital data sequence for transmission in a digital communication system.

BACKGROUND OF THE INVENTION

It has been shown that on strictly band-limited high-signal-to-noise ratio (SNR) channels with Gaussian noise, digital data may be reliably transmitted at rates approaching channel capacity by using a combination of ideal zero-forcing decision-feedback equalization (DFE) and known coded modulation and constellation shaping techniques designed for ideal channels free of intersymbol interference (ISI). However, ideal DFE is not realizable. Trellis precoding is a realizable combined coding, shaping and equalization technique that achieves the same performance as an ideal DFE along with coding and shaping.

One potential drawback of trellis precoding is that it is effective only for signal constellations whose signal points are uniformly distributed within a space-filling boundary region. Space-filling substantially means that a union of proper non-overlapping translations of the boundary region may cover (tile) the entire space. Stated in another way, the boundary region must be representable as a fundamental region of a lattice, typically referred to as a precoding lattice. To be compatible with known coded modulation techniques, a precoding lattice is typically chosen as a scaled version $MZ^2$ of a two-dimensional integer lattice $Z^2$ (where M is a scaling factor) such that the boundary region then has the shape of a square. In certain applications, square signal constellations are not desirable, since they have a higher two-dimensional peak-to-average power ratio (PAR) than constellations with more circular boundaries. More importantly, square constellations are not suitable for representing fractional bits per symbol and require a method known as constellation switching to allow fractional rate transmission, which further increases the two-dimensional PAR. In trellis precoding, it is possible to find precoding lattices whose Voronoi region is more circular than that of a square and which accommodates certain fractional data rates. However, this approach is not very flexible, since it does not uniformly handle all fractional data rates and is more difficult to make invariant to 90° phase rotations, which is an important requirement in certain practical applications. Another drawback of trellis precoding is that to achieve shaping gain, the precoding operation must be combined with shaping operations, which increases the complexity of implementation.

There is a need for a flexible precoding method and device that works with substantially any signal constellation at substantially any data rate and that is implementable independently from constellation shaping while achieving an overall performance that is as close to that of an ideal DFE as possible.

SUMMARY OF THE INVENTION

A device and method are set forth for mapping a digital data sequence into a signal point sequence $x(D)$ for transmission over a channel characterized by a nonideal channel response $h(D)$ using a trellis code C comprising, a mapper for mapping the digital data sequence into a signal point sequence $u(D)$ such that a component $u_k$ of $u(D)$ at a given time k is selected based in part on past components $\{y_{k-1}, y_{k-2}, \ldots\}$ of a channel output sequence $y(D)=x(D)h(D)$ based on feedback information provided by a precoder, and a precoder for generating said signal point sequence $x(D)$ according to $x(D)=u(D)+d(D)$, wherein $d(D)$ represents a nonzero difference between a selected non-zero sequence $c(D)$ and a postcursor intersymbol interference (ISI) sequence $p(D)$ substantially of a form $p(D)=x(D)[h(D)-1]$, wherein $c(D)$ is selected such that the channel output sequence $y(D)$ is a code sequence in said trellis code C.

BRIEF DESCRIPTIONS OF THE DRAWINGS

DETAILED DESCRIPTION OF A PREFERRED EMBODIMENT

The method and device of the present invention permits precoding a digital data sequence for transmission over a digital communication channel, performing particularly well on channels having severe attenuation distortion. Substantial benefits are obtained by utilizing the present invention: transmission at substantially any desired data rate without constellation switching, transmission with circular signal constellations, simplification of shaping by completely separating shaping from precoding, and reduction of dither loss by selecting the output of the mapper based in part upon the past components of a channel output sequence based on feedback information provided by a precoder.

Figure 1:
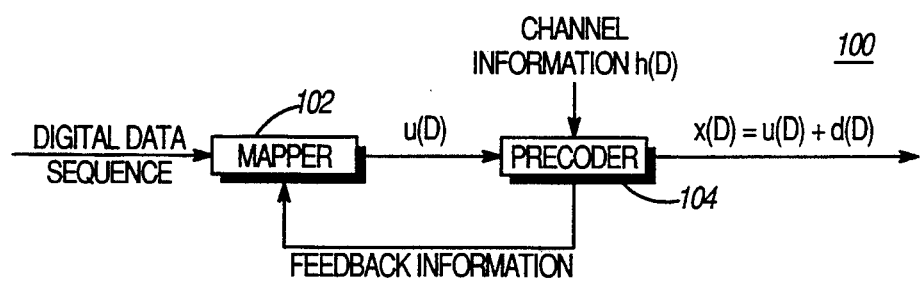
FIG. 1 is a block diagram of a device in accordance with the present invention.

As illustrated in FIG.1, numeral 100, a device precodes a digital data sequence in accordance with the present invention to provide a complex precoded sequence $x(D)=x_0+x_1D+ \ldots$ for transmission over a discrete-time channel unit with a complex impulse response $h(D)=h_0+h_1D+h_2D^2+ \ldots$ using a trellis code C. In this specification, without losing generality, it is assumed that h(D) is monic (i.e., $h_0=1$).

The code C is a 2n-dimensional trellis code, where n is an integer, based on a lattice partition $\Lambda/\Lambda'$, where $\Lambda$ is a preselected lattice and $\Lambda'$ is a preselected sublattice of $\Lambda$, and a rate m/m+r convolutional code. The lattice $\Lambda$ is the union of $2^r$ cosets of a so-called time-zero lattice $\Lambda_0$ of the trellis code where $\Lambda_0$ is a sublattice of $\Lambda$ and $\zeta'$ is a sublattice of $\Lambda_0$. If $y(D)=y_0+y_1D+y_2D^2+\ldots$ is a code sequence in the trellis code, and it is represented as a sequence of 2n-dimensional vector components $y_k=(y_{kn},\ldots,y_{kn+n-1})$, $k=0, 1, \ldots$, then the component $y_k$ at time k will belong to a unique coset of $\Lambda_0$ which is determined by the current state $S_k$ at time k.

The device (100) includes a mapper (102) and a precoder (104). A characteristic of the precoding scheme is that the precoded sequence x(D) may be represented by the sum $$x(D)=u(D)+d(D)$$

where $u(D)=u_0+u_1D+U_2D^2+\ldots$ is a signal point sequence representing the digital data and is provided by the mapper (102). The signal points $u_i, i=0, 1, 2, \ldots$ are chosen from a two-dimensional signal constellation such that each 2n-dimensional component $U_k=(U_{kn},\ldots,U_{kn+n-1})$ of U(D) lies on a translate of the lattice $\Lambda$. The sequence $d(D)=d_0+d_1D+d_2D^2+\ldots$ is a dither sequence that is generated by the precoder (104) according to $$d(D)=c(D)-p(D)$$

where $p(D)=x(D)[h(D)-1]$ is a post-cursor intersymbol interference (ISI) sequence and $c(D)=c_0+c_1D+c_2D^2+\ldots$ is chosen such that the channel output sequence $y(D)=x(D)h(D)=u(D)+c(D)$ is a code sequence from the trellis code C.

A feature of the present invention is that the components $c_k=(C_{kn},\ldots,C_{kn+n-1})$ of the sequence c(D) are selected by the precoder (104) always from the time-zero lattice $\Lambda_0$ of the trellis code C or a sublattice $\Lambda_s$ thereof, and the components $u_k$ of the sequence u(D) are selected by the mapper (102) based in part upon the past values $\{y_{k-1}, y_{k-2}, \ldots\}$ of y(D), such that $u_k$ lies in the coset of $\Lambda_0$ in which the component $y_k$ must lie for y(D) to be a valid code sequence in C. The coset is therefore selected based on the state $s_k$ of the code sequence y(D). The digital data determines the signal points from the selected coset as usual. Information about the past values $\{y_{k-1}, y_{k-2}, \ldots\}$ is provided to the mapper (102) by the precoder (104), which is operably coupled to the mapper (102).

The technique of the present invention differs from a technique described in "ISI coder—Combined coding and precoding," AT&T contribution to EIA-TR 30.1, Baltimore, Md., June 1993, in important ways. In the above-referenced technique, the components $u_k$ are always chosen from a translate of the time-zero lattice $\Lambda_0$ regardless of the state $S_k$ of y(D), while the components $c_k$ are selected from one of $2^r$ cosets of $\Lambda_0$ depending on the state $s_k$. The technique of the present invention is logically simpler since the selection of $c_k$ utilizes the same lattice all the time. Furthermore, the method of the present invention may be made transparent to 90 degree rotations (see below), whereas this cannot be achieved completely in the above-referenced technique. Also, in the present invention, the precoder is automatically disabled for ideal channels (i.e., h(D)=1), whereas in the above-referenced technique, a special procedure must be followed on ideal channels.

Typically, the present invention is utilized where the complex impulse response h(D) has no zeroes on the unit circle, or equivalently, when its inverse, 1/h(D), is stable. Therefore, the following embodiments utilize an h(D) that is a canonical response with a stable inverse. Note that h(D) may be an all-zero response such as h(D)=1+0.75 D, an all-pole response such as h(D)=1/(1−0.75 D), or a more general response that includes zeroes and poles. As in earlier precoding techniques, the response h(D) has been determined and is known at the transmitter and the receiver.

Figure 2:
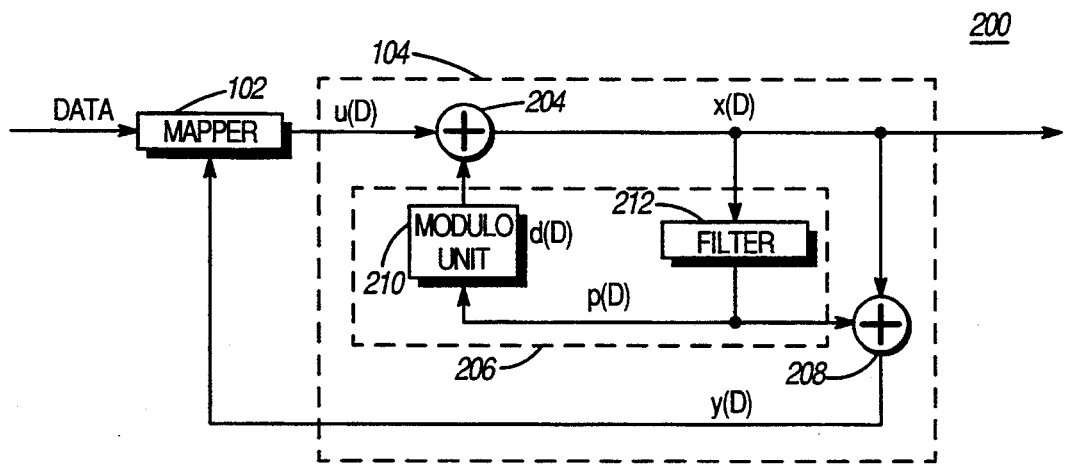
FIG. 2 is a more detailed block diagram illustrating a first embodiment of a device in accordance with the present invention.

FIG. 2, numeral 200, is a more detailed block diagram of a first embodiment of a device in accordance with the present invention. As in FIG. 1, the digital data sequence is first mapped in a mapper (102) into a signal point sequence u(D) using any combination of known encoding, mapping and shaping techniques. The coset of the time-zero lattice $\Lambda_0$ in which the components $u_k=(u_{kn}, u_{kn+n-1}, \ldots, u_{kn+n-1})$ lie is determined based on the past values $\{y_{k-1}, y_{k-2}, \ldots\}$ of y(D) based on feedback information provided by the precoder (104). In this embodiment, the precoder comprises a first combining unit (204) and a filtering/modulo unit (206). The first combining unit (204), typically an adder, is operably coupled to receive the input sequence u(D) and a dither sequence d(D) and forms the precoded sequence $x(D)=u(D)+d(D)$. The filtering/modulo unit (206) includes a filter (212) operably coupled to receive x(D) and is utilized for generating d(D). The filtering/modulo unit (206) further includes a modulo unit (210) that is operably coupled to receive a post-cursor ISI sequence p(D) from the filtering unit (212), where p(D) is obtained by filtering the precoded sequence x(D) that is received from the combining unit (204) in accordance with $p(D)=x(D)[h(D)-1]$. The dither sequence d(D) is given by $d(D)=c(D)-p(D)$, where c(D) is a sequence of 2n-dimensional components $c_k$ chosen from a selected sublattice $\Lambda_s$ of the time-zero lattice $\Lambda_0$. The components $c_k$ are chosen from $\Lambda_s$ such that the average energy of the dither sequence d(D) is kept small.

A second combining unit (208) (typically an adder) combines the precoded sequence x(D) and the post-cursor ISI sequence p(D) to form the channel output sequence y(D) according to $y(D)=x(D)+p(D)$. The sequence y(D) is then fed back to the mapper for coset selection.

Since the components $c_k$ are chosen from a sublattice $\Lambda_s$ of $\Lambda_0$, the channel output components $y_k=u_k+c_k$ will belong to the same coset of $\Lambda_0$ as the signal points $u_k$. Therefore, the channel output sequence y(D) will be a valid code sequence, provided that $u_k$'s are chosen from an allowable coset of the time-zero lattice based on the current state $s_k$ of y(D) in the trellis code.

The modulo unit (210) in FIG. 2 is utilized for finding the dither components $d_k=(d_{kn}, d_{kn+1}, \ldots, d_{kn+n-1})$ in a specified fundamental region of the sublattice $\Lambda_s$, that are congruent to the negative post-cursor ISI components $-p_k=(-p_{kn},-p_{kn+1}, \ldots, -p_{kn+n-1})$ modulo the sublattice $\Lambda_s$. The sublattice $\Lambda_s$ is chosen to obtain a good trade-off between complexity and performance. For low complexity, $\Lambda_s$ may be selected to be an n-fold Cartesian product of a two-dimensional lattice.

The operation of the modulo unit will now be described in more detail with one specific example. Suppose the trellis code is a four-dimensional trellis code that is based on the lattice partition $RZ^4/2D_4$. This code has the time-zero lattice $\Lambda_0 = RD_4$, and therefore $\Lambda_s$ may be chosen as $2Z^4 = (2Z^2)^2$ which is a sublattice of $RD_4$. In this example, the two-dimensional symbols $d_{kn+i}$, $i=0, 1, \ldots, n-1$, are chosen on a symbol-by-symbol basis from the square region $[-1, 1) \times [-1, 1)$ to be congruent to $-p_{kn+i}$ modulo $2Z^2$ (i.e., the real and imaginary parts of $d_{kn+i}$ are congruent to the real and imaginary parts of $-p_{kn+i}$ modulo 2). In some applications, it is important that the precoding scheme be transparent to 90° phase rotations. This is accomplished by using the interval $[-1, 1)$ for positive components of $p_k$, and $(-1, 1]$ for non-positive components. In this case, the mapper will also include a differential encoder which is well-known in the state-of-the-art (e.g., L. F. Wei, "Trellis-coded modulation using multi-dimensional constellations," IEEE Trans. Inform. Theory, vol. IT-33, pp. 483–501, July 1987).

The energy of the transmitted symbols $S_x = E\{|x_i|^2\}$ will be the sum $S_u + S_d$ of the energies of $u(D)$ and $d(D)$, where E is a statistical expectation. The average energy $S_x$ of the transmitted sequence $x(D)$ will be approximately the same as the energy $S_u$ of the signal sequence $u(D)$ as long as the average dither energy $S_d$ is small. That means, the better the approximation $c(D) \approx p(D)$ is, the smaller will be the increase in average energy due to the dither sequence $d(D)$. This is achieved by choosing the elements of $d_k$ from a fundamental Voronoi region of the sublattice $\Lambda_s$. A key advantage of the present invention is that the dither energy is reduced by modifying the sequence $u(D)$ based on the past history of the channel output sequence $y(D)$.

Figure 3:
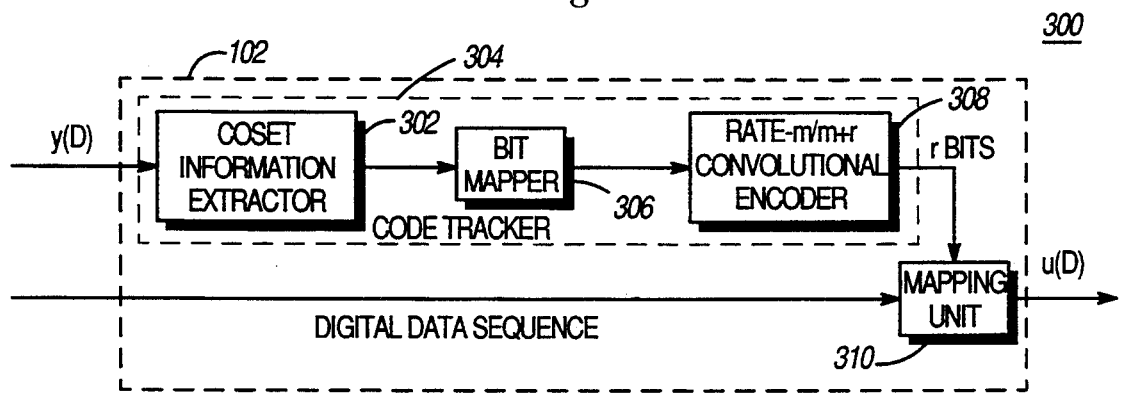
FIG. 3 is a detailed block diagram of the mapper of FIG. 2.

FIG. 3, numeral 300, shows a more detailed block diagram of the mapper (102) which shows a code tracker (304) which is utilized to determine the cosets of $\Lambda_0$ from which the components $u_k$ are selected. The input to the code tracker (304) is the channel output sequence $y(D)$ obtained from the precoder (104). The code tracker (304) includes a coset information extractor (302) for receiving $y(D)$, a bit mapper (306) that is operably coupled to the coset information extractor (302) and a rate $m/m+r$ convolutional encoder (308) that is operably coupled to the mapper. By tracking the cosets of the sublattice $\Lambda'$ of the trellis code in which successive components $y_k$ lie, it is possible to keep track of the state of the code sequence $y(D)$. This information is used to determine from which of the $2^r$ cosets of the time-zero lattice $\Lambda_0$ the components $u_k$ should be selected. As shown in FIG. 3, it is possible to implement this step by utilizing the coset information extractor (CIE) (302) for first extracting the cosets mentioned above using slicing operations, utilizing the bit mapper (306) for converting an output of the CIE to m bits (304) and then passing those bits through the rate $m/m+r$ convolutional encoder (308) to provide r bits which are used together with the digital data symbols by a mapping unit (310) to determine the components $u_k$. These r bits from the convolutional encoder are used to select one of $2^r$ cosets of $\Lambda_0$ in $\Lambda$. For example, in the case of a 4D trellis code based on the partition $RZ^4/2D_4$, a rate $m/m+1$ convolutional encoder is used to produce one extra bit once every two symbols, and this bit is used to select one of two cosets of the time-zero lattice $RD^4$ in $RZ^4$, while the data bits select a four-dimensional point from that coset.

Figure 4:
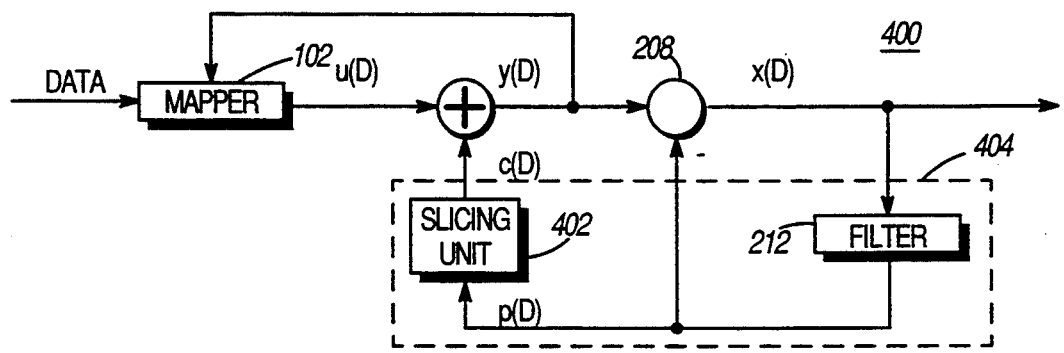
FIG. 4 is a block diagram of a second embodiment of a device in accordance with the present invention.

FIG. 4 shows an alternative embodiment, numeral 400, of the present invention which is substantially equivalent to the first embodiment shown in FIG. 2. In this embodiment, a filtering/modulo unit (404) includes a slicing unit (402) for first selecting the component $c_k$ from the sublattice $\Lambda_s$ and the filtering unit (212) for forming the dither $d_k$ according to $d_k = c_k - p_k$. In this embodiment, the channel output components $y_k$ may be obtained by combining the component $u_k$ with $c_k$ according to $y_k = u_k + c_k$. Information about the sequence $y(D)$ provided by the precoder is used by the code tracker (310) in the mapper (102) to determine the coset of the time-zero lattice $\Lambda_0$ from which the mapper output $u_k$ is selected.

In another example, suppose that again a four-dimensional trellis code based on the partition $RZ^4/2D_4$ is used, but this time the sublattice $\Lambda_s$ is the time-zero lattice $RD_4$ itself. First it should be noted that the sublattice $RD_4$ may be represented as a union of the 4D lattice $2Z^4$ with its coset $2Z^4 + (0, 0, 1, 1)$. Moreover, the 4D lattice $2Z^4$ can be obtained by taking a Cartesian product of the two-dimensional (2D) lattice $2Z^2$ which consists of all pairs of even integers. Therefore $RD_4$ is represented as $$RD_4 = (2Z^2 \times 2Z^2) U[2Z^2 + (1,1)] X [2Z^2 + (1,1)],$$

where U represents the union and X represents the Cartesian product. The union of the 2D lattice $2Z^2$ with its coset $2Z^2 + (1,1)$ forms the 2D lattice $RZ^2$.

Therefore, the slicing unit (410) may select the 4D symbols $c_k = (c_{2k}, c_{2k+1})$ by selecting, in the even symbol interval 2k, its symbol $c_{2k}$ from $RZ^2$. If $c_{2k}$ belongs to $2Z^2$ then in the following odd symbol interval, the second symbol $c_{2k+1}$ is selected from the even integer lattice $2Z^2$. If $c_{2k}$ belongs to the coset $2Z^2 + (1,1)$, however, then in the next odd symbol interval, the second symbol $c_{2k+1}$ is selected from the coset $2Z^2 + (1,1)$. This way it is ensured that the 4D symbol $(c_{2k}, c_{2k+1})$ will belong to $RD_4$.

It should be noted that the invention is not limited to criteria that minimize the average dither energy, and any criterion may be used to select the code sequence $c(D)$ as long as the selection of each $c_i$ is based only upon past values $x_j$, $j < i$, of $x(D)$, and the components $c_k$ belong to the time-zero lattice $\Lambda_0$. For example, in certain applications it may be desirable to limit the range of the channel output symbols $y_i = u_i + c_i$. This may be achieved, at the expense of a higher dither energy $S_d$, by restricting the values of $c_i$ to a certain range.

The above description utilizes an assumption that the channel is characterized by a discrete-time complex impulse response $h(D)$. It is well-known in the state-of-the-art that any discrete time or continuous-time linear channel with additive noise may be represented by a canonical discrete-time equivalent channel with a causal ($h_k = 0$, $k < 0$), minimum-phase (all zeros outside or on the unit circle), monic ($h_0 = 1$) impulse response $h(D)$ and additive white noise $w(D)$. A canonical receiver front-end that includes a whitened matched filter and a sampler (in the case of continuous-time channels) operating at a selected symbol rate may be utilized to provide such an equivalent channel. It should be mentioned that in practice, typically, $h(D)$ represents the combined effect of the filters in the transmitter, channel, the receiver, and a sampler. Similarly, $w(D)$ represents the noise after it passes through the receive filters and the sampler. The whitened-matched filter reduces the strength of the distortion through proper filtering and therein lies the performance advantage of the present invention over conventional linear equalizations.

In practice, when h(D) is an all-zero response, a whitened matched filter may be determined adaptively using standard adaption techniques for decision-feedback equalizers. When it is desired that h(D) be an all-pole filter, then one first determines adaptively an all-zero response h'(D) using the standard methods and then finds h(D)=1/g'(D) using well-known polynomial division techniques, where g'(D) is a finite polynomial approximately equal to g'(D)≈1/h'(D).

Figure 5:
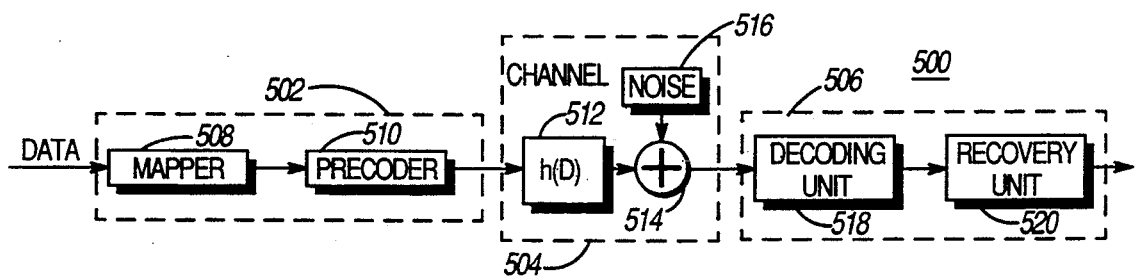
FIG. 5 is a block diagram of a first embodiment of a digital communication system utilizing a device in accordance with the present invention.

A first embodiment of a device of the present invention incorporated into a digital communication system is illustrated in the block diagrams of FIG. 5, numeral 500, wherein at least one of a transmission unit and a receiving unit utilizes the present invention. The said system typically includes at least one of a transmission unit (502) and a receiving unit (506) wherein the transmission unit has a mapper (508) and a precoder (510) for transmitting a digital data sequence and a channel (504) obtained as described in the above paragraph, operably coupled to the precoder (510), for facilitating transmission of the precoded sequence x(D), and the receiving unit (506) has a decoding unit (518), operably coupled to the channel unit (504), for receiving and decoding a received sequence r(D) to provide an estimated output sequence ŷ(D), and a recovery unit (520), operably coupled to the decoding unit (518), for substantially recovering an estimate û(D) of the signal point sequence u(D). An estimate of the transmitted digital data sequence is then found from û(D) using an inverse map and shaping recovery (if constellation shaping is employed).

The equivalent channel (504), represented as set forth above, is substantially represented by a filter (512) having a response h(D), for receiving x(D) and producing an output sequence y(D)=x(D)h(D), defined earlier, an additive noise unit (516) for providing additive noise, and a combining unit (514), typically a summer, operably coupled to the channel filter h(D) (512) and to the additive noise unit (516).

The decoding unit (518) is typically a decoder for the trellis code C, as is known in the art. The decoding unit (518), typically receives and decodes a noisy received sequence r(D) which is of a form:

$$r(D) = x(D)h(D) + w(D)$$
$$= y(D) + w(D)$$
$$= [u(D) + c(D)] + w(D),$$

to provide an estimate ŷ(D) of the channel output sequence y(D)=x(D)h(D), and a recovery unit (520), operably coupled to the decoding unit (518), substantially recovers an estimate û(D) of the input sequence u(D), described more fully below.

As described earlier, the sequence y(D) must be a sequence in the trellis code C. That means that the sequence y(D) may be estimated by a conventional decoder for C, as is known in the art, to provide an estimated output sequence ŷ(D).

Figure 6:
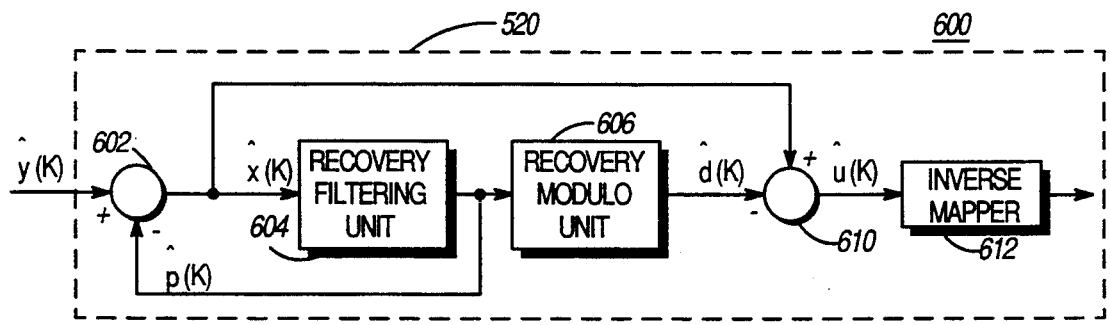
FIG. 6 is a block diagram of a recovery unit of the digital communication system of FIG. 5, showing the recovery unit with more particularity.

The recovery unit (520), illustrated with more particularity in the block diagram of FIG. 6, numeral 600, typically includes at least a recovery filtering unit (604) substantially the same as the filter (212) in the precoder (104), operably coupled to receive an estimated sequence ŷ(D), for filtering ŷ(D) to obtain an estimate p̂(D) of the post-cursor ISI sequence p(D), substantially of a form p̂(D)=ŷ(D)/{1−1/h(D)} and for providing p̂(D) as a feedback signal to obtain x̂(D) from ŷ(D) according to x̂(D)=ŷ(D)−p̂(D), a recovery modulo unit (606), operably coupled to the recovery filtering unit (604), for finding the estimated dither sequence d̂(D), as the sequence whose components d̂$_k$=(d̂$_{kn}$, d̂$_{kn+1}$, . . . , d̂$_{kn+n-1}$) lie in a specified fundamental region of the sublattice $\Lambda_s$, and are congruent to the negative post-cursor ISI components −p̂$_k$=(−p̂$_{kn}$, −p̂$_{kn+1}$, . . . , −p̂$_{kn+n-1}$) modulo the sublattice $\Lambda_s$ in a manner that is substantially the same as that used in the precoding unit at the transmitter, and a recovery combining unit (606), operably coupled to the recovery modulo unit (604) and to the estimator combiner (602) for receiving the estimated sequence x̂(D) of the precoded sequence x(D), for substantially determining a difference between the sequence x̂(D) and the sequence d̂(D) to obtain the estimate û(D) of the original input sequence u(D). As long as there are no decision errors (ŷ(D)=y(D)),and the operations in the transmitter and receiver are substantially symmetrical, the original sequence u(k) will be correctly recovered. Other equivalent implementations of the recovery circuit are also possible.

To summarize, the recovery filtering unit (604) is utilized to reconstruct an estimate p̂(D) of a post-cursor ISI variable p(D), then the recovery modulo unit (604) is utilized to determine a dither sequence d̂(D) that substantially correlates with d(D) in the corresponding device (100) at the transmitter, and then utilizes the recovery combining unit (608) to provide û(D)=x̂(D)−d̂(D).

Of course, there will be occasional errors in ŷ(D) due to channel noise, and these may lead to error propagation. However, since 1/h(D) is stable, the error propagation in the filter 1−1/h(D) will never be catastrophic. Moreover, if h(D) is an all-pole response of order p (where m is a selected integer), then error propagation will be strictly limited to at most p symbols.

Where an estimate û$_i$, an i'th variable of the recovered sequence u(D), falls outside the allowed range of a i'th variable u$_i$ of the input sequence u(D), such a range violation indicates that a decision error has occurred either in the current symbol y$_i$, or c$_i$ is in error because of an error in some recent symbol y$_{j-i}$, i>0. When such range violations are detected, one may try to correct the violations by adjusting the estimates y$_i$ or y$_{j-i}$. Thus, by monitoring the range violations, some degree of error correction is achieved. Such an error detection capability may also be useful for monitoring the performance of the transmission system.

Thus, a digital communications receiver may be utilized in accordance with the present invention for receiving a digital data sequence that was mapped into a precoded sequence x(D) and transmitted over a channel characterized by a nonideal response h(D) using a trellis code C, providing a received sequence r(D), where a receiver includes at least a decoding unit, operably coupled to receive r(D), for decoding the received transmission sequence r(D) to provide an estimated output sequence ŷ(D), and a recovery unit, operably coupled to the decoding unit, for substantially recovering an estimated sequence û(D) for a sequence u(D) for a transmitted signal point sequence x(D) which is generated according to x(D)=u(D)+d(D), wherein u(D) is a signal point sequence which uniquely represents said digital data sequence and wherein the coset of the time-zero lattice $\Lambda_0$ in which 2n-dimensional components $u_k$ lie depends on the state of the channel output sequence y(D), and d(D) represents a nonzero difference between a selected sequence c(D) whose components $c_k$ are selected from a sublattice $\Lambda_s$ of the time-zero lattice $\Lambda_0$ of the trellis code and a post-cursor intersymbol interference (ISI) sequence p(D) substantially of a form p(D)=x(D)[h(D)−1], such that c(D) is selected based only upon p(D).

As illustrated in FIG. 6, one embodiment of the recovery means utilizes an estimator combining unit (602) that is operably coupled to receive the estimated output sequence ŷ(D) and p̂(D), a recovery filtering unit (604), operably coupled to receive the estimated output sequence x̂(D), for providing an estimated post-cursor intersymbol interference (ISI) sequence p̂(D), a recovery modulo unit (606), operably coupled to the recovery filtering means, for providing an estimated dither sequence d̂(D) that substantially correlates with d(D) utilized for providing the transmission sequence x(D), a third combining unit (610) (typically a summer), operably coupled to receive the estimated precoded sequence x̂(D) and to the output d̂(D) of the recovery modulo means, for determining the estimated sequence û(D), substantially of a form û(D)=x̂(D)−d̂(D), and an inverse mapper (612), operably coupled to the third combining means, for inverse mapping the estimated sequence û(D) to provide a recovered digital data sequence substantially equal to the transmitted digital data sequence.

In addition the digital communications receiver may be selected such that the decoding unit (518) further includes a reduced complexity sequence estimator unit that utilizes a correlation between successive symbols $y_i$. In one implementation, the reduced complexity sequence estimator unit utilizes a sequence estimator having a reduced number of states that are determined utilizing state merging techniques for reduced-state sequence estimation (RSSE).

Where desired, the recovery unit may be selected to include a range violation determiner unit. When an i'th variable $\hat{u}_i$ of the recovered sequence û(D) is outside a certain range (a range violation), this unit adjusts at least one of an estimate $\hat{y}_i$ and a past estimate $\hat{y}_{k-j}$ (where j is a positive integer) to substantially correct the range violation.

Figure 7:
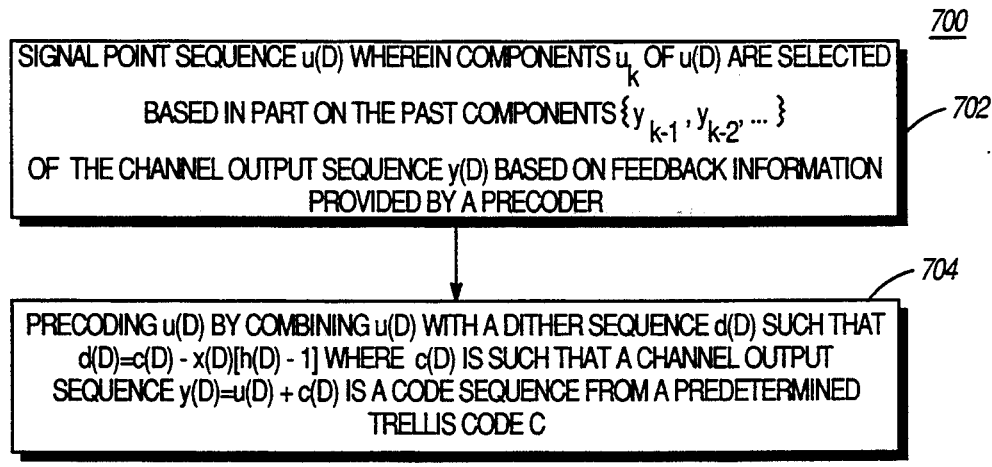
FIG. 7 is a flow diagram setting forth steps of one embodiment in accordance with the method of the present invention.

FIG. 7, numeral 700, sets forth a flow chart illustrating steps in accordance with the method of the present invention for precoding a stream of signal points for transmission in a digital communication system. The method provides for precoding a digital data sequence to generate a sequence x(D) for transmission over a discrete-time channel with an impulse response h(D) using a trellis code C. A stream of signal points u(D) is transmitted as x(D)=u(D)+d(D), where d(D) is a dither sequence of a form d(D)=c(D)−p(D), where p(D)=x(D)[h(D)−1]represents a post-cursor intersymbol interference (ISI), and c(D) is a sequence whose components $c_k$ belong to a sublattice $\Lambda_s$ of the time-zero lattice $\Lambda_0$ of a trellis code C, and c(D) is obtained based only upon p(D). The sequence u(D) uniquely represents the digital data sequence, and its components $u_k$ are selected based in part on past components $\{y_{k-1}, y_{k-2}, \ldots\}$ of the channel output sequence y(D)=x(D)h(D), based on feedback information provided by the precoder, such that y(D) is a code sequence in the trellis code.

In one embodiment, illustrated in FIG. 7, numeral 700, the method for mapping a digital data sequence into a signal point sequence x(D) for transmission over a channel characterized by a nonideal channel response h(D) using a trellis code C includes the steps of: (1) mapping the digital data sequence to a signal point sequence u(D) (702), and (2) precoding the signal point sequence u(D) by combining u(D) with a dither sequence d(D) (704) such that d(D) is of a form: d(D)=c(D)−x(D)[h(D)−1], where c(D) is selected such that a channel output sequence y(D)=u(D)+c(D) is a code sequence from the trellis code C. The components $u_k$ of u(D) are selected based in part on past components $\{y_{k-1}, y_{k-2}, \ldots\}$ of the channel output sequence y(D)=x(D)h(D). The components $c_k$ of c(D) are selected from a sublattice $\Lambda_s$ of the time-zero lattice $\Lambda_0$ of the trellis code. The sequences are as described above.

Figure 8:
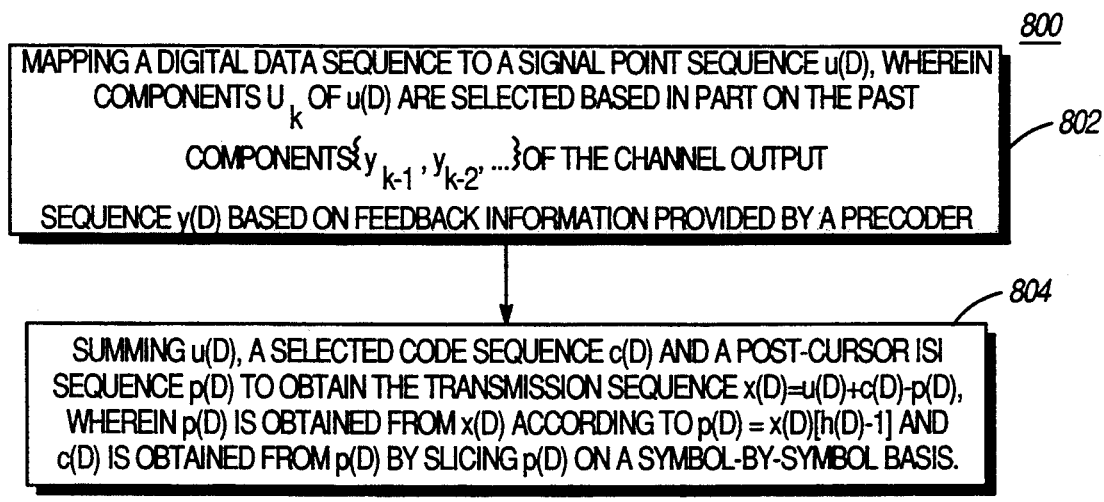
FIG. 8 is a flow diagram setting forth steps of another embodiment in accordance with the method of the present invention.

In another embodiment, illustrated in FIG. 8, numeral 800, the method comprises the steps of mapping the digital data sequence to a signal point sequence u(D) (802), summing u(D), a selected code sequence c(D) and a post-cursor ISI sequence p(D) to obtain the transmission sequence x(D)=u(D)+c(D)−p(D) (804), filtering x(D) to obtain (806) p(D) substantially of a form:

$$p(D) = x(D)[h(D) - 1],$$

and slicing p(D) on a symbol-by-symbol basis to obtain the sequence c(D). Further modifications of the method may be utilized in accordance with the modifications described more fully above for the device of the present invention. Again, the components $u_k$ of u(D) are selected based in part on past components $\{y_{k-1}, y_{k-2}, \ldots\}$ of the channel output sequence y(D)=x(D)h(D). The components $c_k$ of c(D) are selected from a sublattice $\Lambda_s$ of the time-zero lattice $\Lambda_0$ of the trellis code.

Figure 9:
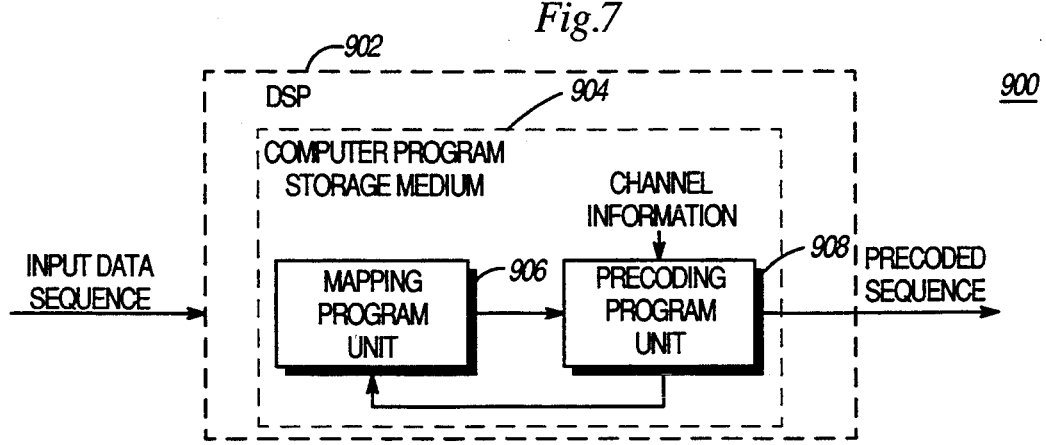
FIG. 9 is a block diagram of a digital signal processor used for precoding a digital data sequence to obtain a sequence $x(D)$ for transmission over a discrete-time channel with an impulse response $h(D)$ in accordance with the present invention.

The present invention may be implemented in a digital communication system, illustrated in FIG. 9, numeral 900, where a digital signal processor (902) is utilized to precode a digital data sequence to obtain a sequence x(D) for transmission over a discrete-time channel with an impulse response h(D). The processor typically includes a program storage medium (904) having a computer program to be executed by the digital signal processor, the program including a mapping program (906) for mapping the digital data sequence into a signal point sequence u(D) based in part upon the past values of a channel output sequence y(D) based on information provided by a precoding program and a precoding program (908) for utilizing the u(D) to generate a sequence x(D) wherein x(D) may be represented as the sum u(D)+d(D) of the stream of signal points u(D) which uniquely represents the digital data sequence and is also chosen based on the state of channel output sequence y(D) and a dither sequence d(D)=c(D)−p(D), where c(D) is a sequence from a sublattice $\Lambda_s$ of the time-zero lattice $\Lambda_0$ of the trellis code C and where p(D) represents a post-cursor intersymbol interference (ISI) sequence of a form p(D)=x(D){h(D)−1}. The code sequence c(D) is determined based upon only the post-cursor ISI sequence p(D). The components $u_k$ of u(D) are selected based in part on past components $\{y_{k-1}, y_{k-2}, \ldots\}$ of the channel output sequence y(D)=x(D)h(D). The components $c_k$ of c(D) are selected from a sublattice $\Lambda_s$ of the time-zero lattice $\Lambda_0$ of the trellis code. Further description of the operation of the processor follows that described above.

The processor typically includes a computer program storage medium having a computer program to be executed by the digital signal processor where the computer program includes a mapping program for mapping the digital data sequence into a signal point sequence u(D) based in part upon the past values of a channel output sequence y(D) based on feedback information provided by a precoding program, and a precoding program for selecting said signal point sequence x(D) from a subset of all possible signal point sequences that are of a form x(D)=u(D)+d(D), wherein d(D) represents a nonzero difference between a selected nonzero sequence c(D) and a postcursor intersymbol interference (ISI) sequence p(D) substantially of a form p(D)=x(D)[h(D)−1], where c(D) is selected based upon p(D) such that the channel output sequence y(D)=u(D)+c(D) is a code sequence from a translate of said trellis code C. In one embodiment, the precoding program includes first combining instruction(s) for combining the input sequence u(D) and a dither sequence d(D) to generate the precoded sequence x(D)=u(D)+d(D), d(D) generating/p(D) generating instructions for generating d(D) and for providing a post-cursor ISI sequence p(D), second combining instructions for generating a sequence y(D)=x(D)+p(D).

The present invention relies on past channel output signals to remove a dither sequence d(D) that is added to an input sequence u(D) at the transmitter to form a transmitted sequence, x(D)=u(D)+d(D), the dither sequence being substantially a difference between a post-cursor intersymbol interference p(D) and an appropriate sequence, c(D), from a sublattice $\Lambda_s$ of the time-zero lattice $\Lambda_0$ of a trellis code. The sequence u(D) is chosen based in part on past components $\{y_{k-1}, y_{k-2}, \ldots\}$ of the channel output sequence y(D)=x(D)h(D) based on feedback information provided by the precoder. The coset of the time-zero lattice $\Lambda_0$ in which successive elements of u(D) should lie are determined based on the past values $\{y_{k-1}, y_{k-2}, \ldots\}$.

The present invention may be utilized with virtually any signaling method and at any data rate. Further, the present invention may be utilized independently of constellation shaping techniques (e.g., shell mapping, "Signal mapping and shaping for V.fast," Motorola contribution D196, CCITT Study Group XVIII, Geneva, June 1992); that means u(D) may represent an already shaped sequence whose signal points have a nonuniform Gaussian-like probability distribution.

In the present invention, the dither sequence may increase the average transmit energy. Since in practice, the average transmit energy must be kept constant, the signal x(D) must be scaled down to maintain the same average energy. The increase in the average transmit energy is referred to herein as a dithering loss.

Although several exemplary embodiments are described above, it will be obvious to those skilled in the art that many alterations and modifications may be made without departing from the invention. For example, even though primarily trellis codes are described above, the method may be used with block or lattice codes as well. It may also be used with selected multilevel trellis codes. Also, although two-dimensional (passband, quadrature) transmission systems are emphasized, the methods may also be applied to one-dimensional (baseband) or higher-dimensional (parallel channels) transmission systems. Further, the invention may be utilized with trellis codes whose dimensionality is odd. Although the description above emphasizes channel responses h(D) that are monic, the invention may also be applied to more general channel responses with $h_0 \neq 1$, by either scaling the channel response to make it monic, or by appropriately scaling the variables of the precoding system. All such implementations are considered substantially equivalent to the present invention.

Accordingly, it is intended that all such alterations and modifications be included within the spirit and scope of the invention as defined in the appended claims.

I claim:

1. A device for mapping an input digital data sequence into an output signal point sequence x(D) for transmission over a channel characterized by a nonideal channel response h(D) using a trellis code C comprising:

a mapper for mapping the digital data sequence into a signal point sequence u(D) such that the components $u_k$ of u(D), where k is a time index, are selected based in part on past components $\{y_{k-1}, y_{k-2}, \ldots\}$ of a channel output sequence y(D)=x(D)h(D) which are obtained based on feedback information provided by a precoder, a precoder for generating said output signal point sequence x(D) according to x(D)=u(D)+d(D), wherein d(D) represents a nonzero difference between a selected sequence c(D) and a postcursor intersymbol interference (ISI) sequence p(D) substantially of a form p(D)=x(D)[h(D)−1], wherein c(D) is selected such that the channel output sequence y(D) is a code sequence in said trellis code C.

2. The device of claim 1 wherein the components $c_k$ of c(D) are selected from a time-zero lattice $\Lambda_0$ of said trellis code or a sublattice $\Lambda_s$ thereof.

3. The device of claim 1 wherein said components $u_k$ of u(D) are selected based on the state $S_k$ of the channel output sequence y(D) in said trellis code.

4. The device of claim 3 wherein said components $u_k$ of u(D) at time k are selected from one of the cosets of the time-zero lattice $\Lambda_0$ based on the state $s_k$ of the channel output sequence y(D) in said trellis code.

5. The device of claim 4 wherein said cosets of the time-zero lattice are determined by utilizing a convolutional encoder for the said trellis encoder.

6. The device of claim 1 wherein said trellis code is a four-dimensional trellis code.

7. The device of claim 6 wherein the trellis code is based on the lattice partition $RZ^4/2D_4$ and its time-zero lattice is $RD_4$.

8. The device of claim 7, wherein said mapper further includes a differential encoder.

9. The device of claim 8, wherein said mapper further includes constellation shaping.

10. The device of claim 9, wherein said constellation shaping is achieved using shell mapping.

11. The device of claim 6 wherein a slicing means provides the selected sequence c(D) by selecting the symbols $c_{2k}$ and $c_{2k+1}$ from the integer lattice $2Z^2$.

12. The device of claim 6 wherein a slicing means provides the selected sequence c(D) by selecting a symbol $C_{2k}$ from $RZ^2$ in a first symbol interval, a symbol $c_{2k+1}$ from either $2Z^2$ or its coset $2Z^2 + (1,0)$ in a second symbol interval, based on $c_{2k}$, where k is a time index.

13. The device of claim 6 wherein, the selection of $c_k$ further includes constraints to limit a range of the symbols $y_i$ of the channel output sequence y(D).

14. The device of claim 1 wherein the precoder comprises at least:
first combining means, operably coupled to the mapper, and to a modulo means, for combining u(D) and at least the dither sequence d(D) to provide a precoded sequence x(D),
wherein the modulo means is operably coupled to a filter, and is utilized for finding the dither sequence d(D) based on the post-cursor ISI sequence p(D),
wherein the filter is operably coupled to the first combining means, and is utilized for extracting the post-cursor ISI sequence p(D) from the transmission sequence x(D).

15. The device of claim 14 wherein the first combining means is a summer.

16. The device of claim 14 wherein the precoder further includes second combining means, operably coupled to the first combining means and to the filter, for obtaining the channel output sequence y(D) substantially of a form y(D)=x(D)+p(D).

17. The device of claim 1 wherein the precoding unit comprises at least:
first combining means, operably coupled to the mapping means and to a slicing means, for combining u(D) and at least the sequence c(D) to provide the channel output sequence y(D),
wherein the slicing means is operably coupled to a filter, and is utilized for slicing the post-cursor sequence p(D) to a sequence of signal points c(D) whose components $C_k$ are selected from a time-zero lattice $\Lambda_0$ of the trellis code C or a sublattice $\Lambda_s$ thereof,
a second combining means, operably coupled to the first combining means and the filter, for combining the channel output sequence y(D) and the post-cursor ISI sequence p(D) to form the precoded sequence x(D), and
wherein the filter is operably coupled to the second combining means, and is utilized for extracting the post-cursor ISI sequence p(D) from the transmission sequence x(D).

18. The device of claim 17 wherein the first combining means is a summer.

19. The device of claim 17 wherein the second combining means is a summer.

20. The device of claim 1 wherein the trellis code C is a block code.

21. A digital communications receiver for receiving a digital data sequence that was mapped into a signal point sequence x(D) and transmitted over a channel characterized by a nonideal response h(D) using a trellis code C, providing a received sequence r(D), comprising at least:
decoding means, operably coupled to receive r(D), for decoding the received transmission sequence r(D) to provide an estimated output sequence ŷ(D), and
recovery means, operably coupled to the decoding means, for substantially recovering an estimated sequence û(D) for a sequence u(D) representing said digital data sequence by first recovering an estimate of the transmitted signal point sequence x(D) generated by a precoder according to x(D)=u(D)+d(D), wherein d(D) represents a nonzero difference between a selected non-zero sequence c(D) and a postcursor intersymbol interference (ISI) sequence p(D) substantially of a form p(D)=x(D)[h(D)−1], wherein c(D) is selected such that the channel output sequence y(D)=x(D)h(D) is a code sequence in said trellis code C and u(D) is selected such that a component $u_k$ at a given time k is selected based in part on past components $\{y_{k-1}, y_{k-2}, \ldots\}$ of a channel output sequence y(D) based on feedback information provided by the precoder, where $u(D)=u_0+u_1D+u_2D^2+, \ldots$ is a signal point sequence representing the digital data provided by a mapper and transmitted to the digital communications receiver.

22. The digital communications receiver of claim 21 wherein the recovery means includes at least:
recovery filtering means, operably coupled to receive the estimated output sequence ŷ(D), for providing an estimated post-cursor intersymbol interference (ISI) sequence p̂(D),
recovery slicing means, operably coupled to the recovery filtering means, for providing an estimated nonzero dither sequence d̂(D) that substantially correlates with d(D) utilized for providing the transmission sequence x(D),
third combining means, operably coupled to receive the estimated output sequence ŷ(D) and to the recovery slicing means, for determining the estimated sequence û(D), substantially of a form û(D)=ŷ(D)−p̂(D)−d̂(D), and
an inverse mapping means, operably coupled to the third combining means, for inverse mapping the estimated sequence û(D) to provide a recovered digital data sequence.

23. The digital communications receiver of claim 21 wherein the nonideal response h(D) represents the impulse response of a noise prediction filter.

24. The digital communications receiver of claim 21 wherein the decoding means further includes a reduced complexity sequence estimator means that utilizes a correlation between successive symbols $y_i$.

25. The digital communications receiver of claim 24 wherein the reduced complexity sequence estimator means utilizes a sequence estimator having a reduced number of states that are determined utilizing state merging techniques for reduced-state sequence estimation (RSSE).

26. A method for mapping an input digital data sequence into an output signal point sequence x(D) for transmission over a channel characterized by a nonideal channel response h(D) using a trellis code C comprising the steps of:
mapping the digital data sequence into a signal point sequence u(D) such that a component $u_k$ of u(D) at a given time k is selected based in part on past components $\{y_{k-1}, y_{k-2}, \ldots\}$ of a channel output sequence y(D)=x(D)h(D) based on feedback information provided by a precoder,
generating, by the precoder, said signal point sequence x(D) according to x(D)=u(D)+d(D), wherein d(D) represents a nonzero difference between a selected non-zero sequence c(D) and a postcursor intersymbol interference (ISI) sequence p(D) substantially of a form p(D)=x(D)[h(D)−1], wherein c(D) is selected such that the channel output sequence y(D) is a code sequence in said trellis code C.

27. The method of claim 26 wherein the components $C_k$ of c(D) are selected from a time-zero lattice $\Lambda_0$ of said trellis code or a sublattice $\Lambda_s$ thereof.

28. The method of claim 26 wherein said components $u_k$ of u(D) are selected based on the state $s_k$ of the channel output sequence y(D) in said trellis code.

29. The method of claim 28 wherein said components $u_k$ of u(D) at time k are selected from one of the cosets of the time-zero lattice $\Lambda_0$ based on the state $S_k$ of the channel output sequence y(D) in said trellis code.

30. The method of claim 29 wherein said cosets of the time-zero lattice are determined by utilizing a convolutional encoder for the said trellis encoder.

31. The method of claim 26 wherein said trellis code is a four-dimensional trellis code.

32. The method of claim 31 wherein the trellis code is based on the lattice partition $RZ^4/2D_4$ and its time-zero lattice is $RD_4$.

33. The method of claim 32, wherein said mapper further includes a differential encoder.

34. The method of claim 33, wherein said mapper further includes constellation shaping.

35. The method of claim 34, wherein said constellation shaping is achieved using shell mapping.

36. A digital signal processor having at least a plurality of registers and an arithmetic logic unit, for use in a digital communication system to precode a digital data sequence into a signal point sequence x(D) for transmission over a discrete-time channel with a impulse response h(D) using a trellis code C, the processor having a device comprising:

mapping means for mapping, using the plurality of registers and the arithmetic logic unit, the digital data sequence into a signal point sequence u(D) such that a component $u_k$ of u(D) at a given time k is selected based in part on past components $\{y_{k-1}, y_{k-2}, \ldots\}$ of a channel output sequence y(D)=x(D)h(D) based on feedback information, precoding means for generating, using the plurality of registers and the arithmetic logic unit, said signal point sequence x(D) according to x(D)=u(D)+d(D), wherein d(D) represents a nonzero difference between a selected non-zero sequence c(D) and a postcursor intersymbol interference (ISI) sequence p(D) substantially of a form p(D)=x(D)[h(D)−1], wherein c(D) is selected such that the channel output sequence y(D) is a code sequence in said trellis code C.

37. The signal processor of claim 36 wherein the components $c_k$ of c(D) are selected from a time-zero lattice $\Lambda_0$ of said trellis code or a sublattice $\Lambda_s$ thereof.

38. The signal processor of claim 36 wherein said components $u_k$ of u(D) are selected based on the state $s_k$ of the channel output sequence y(D) in said trellis code.

39. A digital communication system for precoding a digital data sequence into a signal point sequence x(D) for transmission over a discrete-time channel with a impulse response h(D) using a trellis code C, comprising at least one of:

a transmission unit and
a receiving unit, wherein the transmission unit having a digital signal processor with at least a plurality of registers and an arithmetic logic unit, comprises:

a mapper for mapping, using the plurality of registers and the arithmetic logic unit, the digital data sequence into a signal point sequence u(D) such that a component $u_k$ of u(D) at a given time k is selected based in part on past components $\{y_{k-1}, y_{k-2}, \ldots\}$ of a channel output sequence y(D)=x(D)h(D) based on feedback information provided by a precoder, a precoder for generating, using the plurality of registers and the arithmetic logic unit, said signal point sequence x(D) according to x(D)=u(D)+d(D), wherein d(D) represents a nonzero difference between a selected non-zero sequence c(D) and a postcursor intersymbol interference (ISI) sequence p(D) substantially of a form p(D)=x(D)[h(D)−1], wherein c(D) is selected such that the channel output sequence y(D) is a code sequence in said trellis code C, and the receiving unit includes:

a decoding unit, operably coupled to the channel, for receiving and decoding a received sequence r(D) to provide an estimated output sequence $\hat{y}$(D), and a recovery unit, operably coupled to the decoding unit, for substantially recovering an estimate $\hat{u}$(D) of the signal point sequence u(D).

40. The system of claim 39 wherein the decoding unit is a decoder for the trellis code C that receives and decodes a noisy received sequence r(D) which is of a form:

$$\begin{aligned} r(D) &= x(D)h(D) + w(D) \\ &= y(D) + w(D) \\ &= [u(D) + c(D)] + w(D), \end{aligned}$$

where w(D) represents additive white noise, to provide an estimate $\hat{y}$(D) of the channel output sequence y(D)=x(D)h(D), and the recovery unit, operably coupled to the decoding unit, substantially recovers an estimate $\hat{u}$(D) of the input sequence u(D).

41. The system of claim 39 wherein the components $C_k$ of c(D) are selected from a time-zero lattice $\Lambda_0$ of said trellis code or a sublattice $\Lambda_s$ thereof.

42. The device of claims 39 wherein said components $u_k$ of u(D) are selected based on the state $S_k$ of the channel output sequence y(D) in said trellis code.

* * * * *